United States Patent [19]

Hasegawa

[11] 4,406,516

[45] Sep. 27, 1983

[54] MONOMODE FIBERGUIDE TELECOMMUNICATION SYSTEM UTILIZING SOLITON PULSES

[75] Inventor: Akira Hasegawa, New Providence, N.J.

[73] Assignee: Bell Telephone Laboratories, Incorporated, Murray Hill, N.J.

[21] Appl. No.: 257,861

[22] Filed: Apr. 27, 1981

[51] Int. Cl.$^3$ .............................................. G02B 5/14
[52] U.S. Cl. .............................. 350/96.29; 350/96.23
[58] Field of Search ............... 350/96.29, 96.23, 96.31, 350/96.34

[56] References Cited

U.S. PATENT DOCUMENTS 4,070,091  1/1978  Taylor et al. .................... 350/96.29
4,099,835  7/1978  French et al. ................... 350/96.29

OTHER PUBLICATIONS

Unger, I., "Optical Pulse Distortion in Glass Fibers", *Archiv fur Elektronik und Ubertragungstechnik*, v. 31 (12), pp. 518-519 1977.
Mollenauer, L. et al., "Experimental Observation of Pulse Narrowing", Physical Review Letters, vol. 45 (13), pp. 1095-1098, 1980.
Hasegawa, A. et al., "Transmission of Stationary Nonlinear Optical Pulses" Applied Physics Letters, vol. 23 (3), pp. 142-144 1973.
Kapron, F. P., "Maximum Information Capacity of Fibre Optic Waveguides", *Electronic Letters*, vol. 13, pp. 96-97 1977.
Kodama, Yuji, "Higher Order Approximation in the Reduction Perturbation Method," Jour. Phys. Soc. of Japan, vol. 45 7/78, p. 311.
McLaughlin, D. W. et al., "Solitons under Perturbations", *A Physical Review*, vol. 16 (2), pp. 777-790 1977.
Cohen et al., "Microlenses for Coupling Junction Lasers", *Applied Optics*, vol. 13 (1), pp. 89-94 1974.

*Primary Examiner*—David K. Moore
*Attorney, Agent, or Firm*—Eugen E. Pacher; Richard D. Laumann

[57] ABSTRACT

The data transmission rate link length product of monomode fiberguide telecommunication systems can be increased above values possible in "linear" systems by appropriate use of the non-linear dependence of the fiber refractive index on electric field. In particular, selecting the appropriate pulse peak power and center wavelength can result in creation of a soliton, i.e., a pulse capable of substantially dispersionless transmission. The center wavelength is to be close to, but larger than, the wavelength of zero first-order chromatic dispersion of the fiberguide, and the latter wavelength is to be within the anomalous dispersion regime of the fiberguide. Criteria for determining the appropriate peak power, center wavelength, fiber loss, and minimum link length, as well as the asymptotic pulse width and soliton spread due to the power loss in the fiber are given, and facilitate design of a system according to the invention.

5 Claims, No Drawings

MONOMODE FIBERGUIDE TELECOMMUNICATION SYSTEM UTILIZING SOLITON PULSES

FIELD OF THE INVENTION

This application pertains to high data rate monomode fiberguide optical telecommunication systems.

BACKGROUND OF THE INVENTION

Impressive progress has recently been made in the field of optical telecommunications. Systems are not being installed that permit transmission of data at a rate of many megabits per second over distances of several kilometers between repeaters. However, since the economics of systems such as, for instance, intercontinental submarine cable systems, are strongly affected by data rate and repeater spacing, work directed towards improvement in these system parameters continues.

Optical pulses transmitted through a fiberguide suffer change and degradation due to a number of effects, even if the source spectral width is so small that the frequency spectrum of the signal is substantially transform limited, as it is assumed to be throughout the examples given in this application. Among these effects is attenuation due to absorption or scattering, i.e., a progressive loss of signal amplitude, which ultimately results in loss of detectability of the signal if the signal amplitude becomes comparable to or less than the receiver noise. Pulses are also subject to dispersion, typically resulting in a broadening of the pulse in the time domain. If such broadening is sufficiently severe, adjacent pulses can overlap, again resulting in loss of signal detectability.

Although several distinct dispersion mechanisms can be identified in optical fiberguides, for purposes of this application the significant one is chromatic dispersion. A material of index of refraction n exhibits material dispersion at a wavelength $\lambda$ if $(d^2n/d\lambda^2) \neq 0$ at that wavelength. Physically this implies that the phase velocity of a plane wave traveling in such a medium varies nonlinearly with wavelength, and consequently a light pulse will broaden as it travels through such medium. In addition, signals propagating in a waveguide are subject to waveguide dispersion, which typically also is wavelength-dependent. I will refer herein to the combined material and waveguide dispersion as "chromatic" dispersion. As an example typical of magnitudes of chromatic dispersion effects, in a typical monomode fiber a 10 ps pulse of carrier wavelength 1.5 $\mu$m doubles its width after about 650 m. This doubling distance is inversely proportional to the square of the pulse width, hence a 5 ps pulse will double its width after about 160 m.

If $(d^2n/d\lambda^2) > 0$ throughout a certain wavelength regime then the medium is said to be normally dispersive in that regime. On the other hand, the wavelength regime throughout which $(d^2n/d\lambda^2) < 0$ constitutes the anomalous dispersion regime. In silica, a regime of normal dispersion extends from short wavelengths to about 1.27 $\mu$m, and an anomalous dispersion regime from about 1.27 $\mu$m to longer wavelengths. Separating the two regimes is a wavelength at which $(d^2n/d\lambda^2) = 0$, i.e., at which material dispersion is zero to first order. This wavelength depends on the composition of the medium. The wavelength at which chromatic dispersion vanishes to first order similarly is composition-dependent, and in addition depends on such fiber parameters as diameter and doping profile. It can, for instance, be as high as about 1.5 $\mu$m in appropriately designed monomode silica-based fibers.

A natural choice of carrier wavelength in a high data rate telecommunication system is the wavelength of first-order zero chromatic dispersion in the fiber. However, even at this wavelength, pulse spreading occurs due to higher order terms in the dispersion. See, for instance, F. P. Kapron, *Electronics Letters*, Vol. 13, pp. 96–97 (1977). In the case of operation at the wavelength of first-order zero chromatic dispersion, the distance over which the pulse width doubles is inversely proportional to the cube of the pulse width. In addition, the pulse distorts in a nonsymmetric way, and an oscillating tail appears. Because of the phase interference produced by the oscillating tail, a reasonable limitation of the pulse width acceptable in a system whose carrier wavelength is equal to the wavelength of first-order zero chromatic dispersion is given by $2t_oL^{-\frac{1}{3}} = 1.4$ ps(km)$^{-\frac{1}{3}}$, in which $2t_o$ is the pulse width, and L is the length of fiberguide over which the pulse is to be transmitted. This expression has been proposed by H. P. Unger, *A. E. U., Archiv fur Elektronik und Ubertragungstechnik* Vol. 31, pp. 518–519 (1977). Thus, for "linear" transmission through a fiber channel of 20 kilometers, the minimum pulse width is about 3.8 ps. Hence, the theoretical maximum "linear" transmission rate over a 20 km link even at the zero group dispersion wavelength is about 0.13 Tbits/second. In reality, however, it is practically impossible to achieve and maintain exact equality between the carrier wavelength and the wavelength of minimum chromatic dispersion. Small deviations in $\lambda$ ($\sim 1\%$) from this wavelength reduce the maximum bit rate to about 0.01 Tbits/second.

Recently it has been proposed to use the nonlinear change of dielectric constant (Kerr effect) of a monomode fiberguide to compensate for the effect of chromatic dispersion, i.e., to utilize solitons. A soliton is a solution of a nonlinear differential equation that propagates with a characteristic constant shape, and, for purposes of this application, I mean by "soliton" both such a solution and the corresponding pulse that maintains its shape during transmission through a fiberguide. The concept of shape-maintenance will be refined below.

When the effect on the signal pulse due to a nonlinear dependence of the index of refraction on electric field is balanced with that due to the chromatic dispersion, the possibility that the optical pulse can form a soliton has been shown to exist, and the possibility of stationary transmission of such a pulse was predicted. A. Hasegawa and F. Tappert, *Applied Physics Letters*, Vol. 23(3), pp. 142–144 (1973). That paper dealt with lossless monomode fibers, and, inter alia, taught the existence of a minimum pulse power, dependent on fiber parameters and wavelength, above which solitons can exist. These predictions of Hasegawa and Tappert have been verified, by demonstrating dispersionless transmission of a 7 ps pulse with a peak power of $\sim 1$ Watt at $\lambda = 1.45$ $\mu$m through monomode fiber for a distance of about 700 meters. See L. F. Mollenauer et al, *Physical Review Letters*, Vol. 45(13), pp. 1095–1098 (1980).

Utilization of the Kerr effect to achieve pulse self-confinement in multimode fibers has also been proposd recently. U.S. patent application, Ser. No. 230,322, filed Feb. 2, 1980 by A. Hasegawa, entitled "Multimode Fiber Lightwave Communication System Utilizing Pulse Self-Confinement."

SUMMARY OF THE INVENTION

This invention concerns monomode fiberguide telecommunication systems and teaches that improved data transmission rate.link length products are possible in such systems through proper choice of operating wavelength and pulse power. In particular, I teach that, with the carrier wavelength (i.e., center wavelength of the pulse) chosen to be within the anomalous dispersion regime of the fiberguide, and the fiber loss at the carrier wavelength so low that the e-folding distance of the electric field in the fiber is larger than the characteristic length required for establishing a stationary soliton pulse, a pulse having peak power P between 9/4 and ¼ of a "balanced" peak power $P_o$ results in a one-soliton pulse that substantially retains its shape even in the presence of higher order chromatic dispersion and of fiber loss. Expressions will be given that facilitate the determination of an advantageous carrier wavelength and input power to yield fiberguide systems permitting extremely high data transmission rate.link length products. A system according to the invention balances the usual chromatic dispersion effect on pulse shape with the effect due to the nonlinear dependence of the refractive index on electric field, thereby obtaining the capability of achieving pulse self-confinement. In combination, the two effects can result in pulses of substantially stationary shape, i.e., solitons. Finite fiber loss and higher order terms in the material dispersion result in departure from stationarity, but the departure can be relatively small and can be determined from expressions disclosed below. Choice of carrier wavelength very close to, but larger than, the wavelength of zero first-order chromatic dispersion $\lambda_c$ permits creation of solitons with relatively low power. However, a minimum wavelength difference between carrier wavelength $\lambda$ and $\lambda_c$ exists since all wavelengths contained in the spectrum of the pulse have to be above $\lambda_c$, and furthermore, higher order material dispersion effects must be small at the carrier wavelength.

DETAILED DESCRIPTION

After some explanatory remarks I will first briefly outline the technique used to derive the results that can be applied to design high capacity monomode fiberguide telecommunication systems according to the invention, and then apply the results in design examples.

As has been pointed out above, higher-order chromatic dispersion effects limit the attainable data transmission rate in monomode fiberguide systems even when the carrier wavelength exactly equals the wavelength of first-order zero chromatic dispersion. However, the data transmission rate of such a system can be increased beyond this "linear" maximum rate through appropriate utilization of the nonlinearity of the waveguide refractive index. In particular, soliton pulses permit such increased rate.

A system according to the invention comprises a source of pulsed electromagnetic radiation, typically a laser emitting in the near infrared, a monomode fiberguide link, typically comprising fiber having a core region surrounded by a cladding having a lower refractive index than the core, and means for coupling at least a part of the source emission into the core of the fiberguide. Such means are well known in the art, and can be, for instance, microlenses. L. G. Cohen and M. V. Schneider, *Applied Optics*, Vol. 13(1), pp. 89–94 (1974). Adjusting the source power such that the peak power of the radiation coupled into the fiber is between about ¼ and 9/4 of a so-called "balanced" peak power can result in the formation of solitons. The magnitude of the balanced peak power depends on the parameters of the fiberguide (e.g., effective core cross-sectional area, refractive index), the pulse width, and the center wavelength of the pulse, as will be shown in detail below. In order for solitons to establish themselves, the length of the fiberguide channel must be at least approximately as large as the so-called soliton formation length. The latter depends on the pulse center wavelength and peak power, as well as the quadratic coefficient of the refractive index, as will also be shown below. The fiber loss at the pulse center wavelength is typically to be small. In particular, the e-folding distance, i.e., the fiber length which causes a decrease of pulse amplitude by about 63%, is at least about as large as the soliton formation length. Also, the center wavelength is to be selected to exceed the wavelength of first-order zero chromatic dispersion of the fiberguide by at least about the spectral width of the radiation pulse. And furthermore, the first-order zero chromatic dispersion wavelength is in the anomalous dispersion regime of the fiber. If these conditions are obeyed then soliton pulses can exist. A principal objective of using soliton pulses typically is to increase the maximum data transmission rate of a fiberguide telecommunication system over the maximum rate possible when operating the system in the linear regime, i.e., typically with $\lambda = \lambda_c$. However, since operation according to the invention results in pulses that typically spread much more slowly than prior art pulses, another possible objective is to increase the link length or repeater spacing of a system, without increasing the data rate. It is, of course, also possible to achieve both these objectives simultaneously to varying degrees.

I will now outline a technique useful in deriving the design parameters of a system according to the invention. Following the method used by A. Hasegawa and F. Tappert in *Applied Physics Letters*, Vol. 23(3), pp. 142–144 (1973), incorporated herein by reference, it can be shown that a stationary solution for the electric field envelope function $\phi(x,t)$ of a pulse in a fiberguide without loss and higher order chromatic dispersion has, in a coordinate frame moving at the group velocity $v_g = \partial\omega/\partial k$ of the pulse, the form $$q(\tau,\xi) = q_o \operatorname{sech}(q_o\tau)\exp(iq_o^2\xi/2), \qquad (1)$$

where x is the axial fiber coordinate, t is the time, and q, $\tau$, and $\xi$ are the normalized envelope function, time, and axial coordinate, respectively, namely $$q = 10^{4.5}(\pi n_2)^{\frac{1}{2}}\phi,$$

$$\tau = 10^{-4.5}|-\lambda k''|^{\frac{1}{2}}|t - x/v_g|,$$

and $$\xi = 10^{-9}x/\lambda.$$

In these expressions, $n_2$ is the quadratic coefficient of the index of refraction, $\mu$ is the vacuum center wavelength, $k''$ is the second derivative of the wave number k with respect to radial frequency $\omega$, with $k'' < 0$, i.e., the solution is valid only in the anomalous dispersion regime.

The above solution shows that a stationary pulse of the form $|q| = q_o \operatorname{sech}(q_o\tau)$ is possible even in the presence of group dispersion, i.e., the effect of chromatic dispersion on a signal of finite bandwidth. As was pointed out above, such a stationary solution appears due to a balancing of the group dispersion effect with the effect due to the nonlinear response of the fiber to the electric field of the pulse, resulting in self-confinement of the pulse.

The value of pulse width $2t_o$ which makes $q_o t_o = 1$ gives the pulse width at which the pulse height drops to about $0.65 q_o$. Using this relationship to express the balanced peak electric field $\phi_o$ results in equation (2).

$$\phi_o = \frac{\sqrt{2}\,(-\lambda^2 \partial^2 n/\partial \lambda^2)^{\frac{1}{2}}}{\omega_o t_o \sqrt{n_2}} \quad (2)$$

In this expression, $\omega_o = 2\pi c/\lambda$ is the carrier angular frequency, and c is the speed of light in vacuum. It will be recalled that $\partial^2 n/\partial \lambda^2 < 0$ in the anomalous dispersion regime, the wavelength region of interest here.

It is frequently more convenient to express the relationship between soliton pulse amplitude and pulse width in terms of the peak power $P_o$, where $$P_o = (\tfrac{1}{2}\phi_o^2 \epsilon_o S n c),$$

with S the effective cross sectional area of the fiber core, $\epsilon_o$ the permeability of free space, and n the refractive index of the fiberguide. The other symbols retain the previously defined meanings. This substitution yields $$P_o = \frac{c\epsilon_o n S(-\lambda^2 \partial^2 n/\partial \lambda^2)}{n_2 \omega_o^2 t_o^2} \quad (3)$$

The soliton concept loses its meaning when $\partial^2 n/\partial \lambda^2 = 0$. Thus, in order to create soliton pulses at relatively low power, the carrier wavelength should be chosen close to, but larger than, the zero first-order chromatic dispersion wavelength of the fiber, in the wavelength region where $\partial^2 n/\partial \lambda^2 < 0$.

Any reasonably shaped input pulse whose peak power P satisfies $P_o/4 < P < 9P_o/4$, and whose "area" A satisfies $$A \sim 1.3 W^{\frac{1}{2}} ps \pm 50\%,$$

can result in formation of a solution.

More generally, the number of solitons N resulting from a particular input pulse is determined by the value of the "area" A. For instance, if $\phi(\tau,0) = aq_o \text{sech}(q_o\tau)$, N = 1, for $\frac{1}{2} \leq a < 3/2$. However, for a within this range but $\neq 1$, the asymptotic value of the pulse height is different from the initial value, and similarly, the asymptotic and initial pulse widths are not identical. Thus, the nonlinearity of the fiber can be utilized to produce pulse contraction. To make this quantitative, in the case of a sech pulse with $a = 1 + \alpha$, with $|\alpha| < \frac{1}{2}$, the asymptotic pulse height $a_\infty = (1 + 2\alpha)$. The asymptotic peak power, being proportional to the square of the pulse height, thus differs from the initial peak power by a factor $$\left(\frac{1 + 2\alpha}{1 + \alpha}\right)^2.$$

Also, the asymptotic pulse width differs from the initial width by a factor $(1 + 2\alpha)^{-1}$.

Although multiple-soliton pulses can be created, for communication purposes the one-soliton pulse is most advantageous, since pulses having $N > 1$ assume relatively complicated shapes.

The treatment so far has assumed a lossless fiber without higher-order material dispersion. I will now extend the treatment to include loss and higher order dispersion, by treating these effects as separate perturbations of the homogeneous nonlinear Schrodinger equation, whose solution is equation (1), supra.

The perturbation term due to higher order dispersion is $i\beta(\partial^3 q/\partial \sigma^3)$, with $$\beta = \frac{10^{-4.5}}{6} (k'''/k'') (-\lambda k'')^{\frac{1}{2}},$$

where $k'''$ signifies $\partial^3 k/\partial \omega^3$. The situations of interest in this application typically satisfy $\beta < < 1$. All terms have been previously defined. Following Y. Kodama, *Journal of the Physical Society, Japan*, Vol. 45, pp. 311–314 (1978), the solution of the homogenous equation is expanded in powers of the small parameter $\beta$, yielding an equation for the first order correction term to the homogenous solution. Successive applications of the technique of Kodama (op. cit) give a solution, valid for $\tau \sim O(\beta^{-1})$, that reveals that higher order dispersion changes the soliton velocity by a factor of the order $\beta$, and deforms the shape of the soliton pulse by a factor of the same order. Thus, the soliton is stable to order $\beta$ in a fiber having non-zero higher order material dispersion at the carrier wavelength.

Next I will outline a method for determining the effect of fiber loss on the soliton. The perturbation term due to dissipation in the fiberguide is $-iq\Gamma$, where $\Gamma = 10^9 \lambda \gamma$, with $\gamma^{-1}$ the e-folding distance of the electric field amplitude due to the fiber loss. Using a method published by J. P. Keener and D. W. McLaughlin, *Physical Review A*, Vol. 16, pp. 777–790 (1977), one finds a quasi-stationary solution that shows that the amplitude of the soliton decays as $\exp(-2\Gamma\xi)$, and that the width of the soliton increases by a factor $\exp(2\Gamma\xi)$.

As an illustration, consider a fiber having loss of 0.2 dB/km for $\lambda = 1.5\ \mu m$, the $\Gamma = 0.023$ km$^{-1}$. Thus, after 20 km, the width of a soliton pulse will have increased by a factor of about 2.7 due to the effect of fiber loss on the soliton.

Before a pulse settles down to the asymptotic soliton, its shape oscillates and the pulse loses some energy. A characteristic length $L_o$, proportional to $n_2^{-1}$, can be defined, and for soliton transmission it is necessary that the channel length $L \gtrsim L_o$. In silica-based fiber, for wavelengths near the zero chromatic dispersion wavelength, $L_o(km) \sim 5.3 \cdot 10^{-3} \lambda(\mu m) S(\mu m^2)/P(W)$ Furthermore, the characteristic length $L_o$ also defines an upper bound on the permissible fiber loss, since the soliton property of a pulse is lost if $L_o \gtrsim \gamma^{-1}$, the e-folding distance of the electric field in the fiberguide.

I will now apply these results in a design example. The example uses parameter values that can be expected of high quality silica-based monomode fiber. I will assume the following values throughout, unless noted otherwise: wavelength of zero first-order chromatic dispersion $\lambda_c = 1.5\ \mu m$, loss 0.2 db/km, index of refraction n = 1.5, quadratic coefficient of the index of refraction $n_2 = 1.2 \cdot 10^{-22} (m/V)^2$, effective core cross section of the fiberguide $S = 20 \ \mu m^2$.

The following relationships either already have been derived explicitly above, or are implicit in the above results, and are collected here because of their utility in designing a soliton-based telecommunication system.

(a) Relationship between the balanced peak power $P_o$ and pulse width $2t_o$ for a stationary solution:

$$P_o = \frac{c\epsilon_o n S(-\lambda^2 \partial^2 n/\partial \lambda^2)}{n_2 \omega_o^2 t_o^2},$$

or, in silica-rich fiber, $$2t_o^2(ps^2)P_o(W) = S(\mu m^2)\lambda(\mu m)[\lambda - \lambda_c](\mu m); \quad (4)$$

(b) Asymptotic pulse width $2t$ when the initial power $P_i$ is not equal to the balanced power $P_o$:

$$2t = \frac{2t_o}{1 + 2\alpha}, \quad |\alpha| < \tfrac{1}{2}, \quad (5)$$

where $$\alpha = (P_i/P_o)^{\frac{1}{2}} - 1;$$

(c) Soliton spread due to the fiber loss:

$$2t(x) \sim 2t_o \exp[2\Gamma x], \quad (6)$$

which becomes $2t_o \exp[0.046 \times (km)]$ for fiber having 0.2 dB/km loss;

(d) Minimum distance $L_o$ required for formation of a soliton:

$$L_o^{-1} \sim \delta_o n_2 |\phi|^2/2c, \text{ or, in silica-rich fiber,}$$

$$L_o(km) \sim 5.3 \ 10^{-3} \ \lambda(\mu m) S(\mu m^2)/P(W) \quad (7)$$

(e) Limits on $\Delta\lambda = \lambda - \lambda_c$, the difference between the carrier wavelength $\lambda$ and the zero dispersion wavelength $\lambda_c$:

Although the power required to create a soliton goes to zero at $\lambda = \lambda_c$, the soliton concept loses its meaning for this wavelength. There is a smallest $\Delta\lambda$, $\Delta\lambda_{min}$, at which the soliton still retains its property.

$$\Delta\lambda_{min} \sim \frac{1}{2t_\infty} \frac{\partial \lambda}{\partial f}, \quad (8)$$

or, in silica-rich fiber, $$\Delta\lambda_{min}(\mu m) \sim 3.3 \cdot 10^{-3} \frac{\lambda^2(\mu m^2)}{2t_\infty(ps)} \quad (8')$$

This condition assures that all wavelengths contained in the pulse spectrum are greater than $\lambda_c$, and thus are within the anomalous dispersion regime. However, a second condition has to be fulfilled simultaneously. In silica-rich fiber this condition can be expressed as $$\Delta\lambda_{min}(\mu m) \sim 1.9 \cdot 10^{-2} [\lambda(\mu m) - 1]/2t_\infty(ps) \quad (9)$$

whereas in the general case the restriction is contained in the inequality $\beta/\tau \lesssim 0.05$. This condition assures that higher order material dispersion effects are small.

The conditions expressed by equations (8) and (9) are independent of each other and thus do not necessarily yield the same value for $\Delta\lambda_{min}$, although the values typically are of similar magnitude, such that compliance with the condition expressed by equation (8) frequently suffices.

The principal relationships necessary to design a system according to the invention having been given above, I will now outline an exemplary design. It is advantageous to select a carrier wavelength $\lambda$ close to $\lambda_c$, since this minimizes the required power, thus $\lambda = \lambda_c + \Delta\lambda_{min}$ is an advantageous operating wavelength. Furthermore, since the pulse spreading depends on the fiber loss, it is typically advantageous to use fiber having $\lambda_c$ at or very near a loss minimum. For instance, in high quality silica-rich fiber the lowest loss typically occurs at about 1.55 $\mu m$, thus a fiber designed to have $\lambda_c \sim 1.55 \ \mu m - \Delta\lambda_{min}$ can be advantageously used.

A soliton having the balanced peak power $P_o$ (see equation (4)) does not spread in a lossless fiber, and spreads according to equation (6) in a lossy fiber. This spread obviously lowers the possible data rate. However, since a pulse having a peak power $P_i > P_o$ contracts, as is shown by equation (5), the data rate can be increased if the input peak power is increased. The maximum peak power still resulting in formation of a one-soliton pulse is about 2.25 $P_o$ (i.e., $\alpha = 0.5$ in equation (5)). Thus the highest data rate can be achieved if the input peak power $P_i \sim 2.25 \ P_o$.

The width of a soliton pulse contracts as long as the peak power $P > P_o$, but expands once $P < P_o$. The loss present in all real fibers attenuates the signal, and eventually reduces $P$ below $P_o$, thus causing pulse broadening at a rate faster than predicted by equation (6). When $P \sim P_o/4$ the soliton property vanishes, and the pulse behaves in the usual linear fashion, i.e., it is subject to the usual chromatic dispersion without non-linear self-confinement. Since a soliton-based system has to have $\lambda > \lambda_c$, it is clear that chromatic dispersion would then be appreciable. Thus a system according to the invention is typically designed such that the pulse peak power at the detector is not substantially less than $P_o/4$.

As had been pointed out above, the theoretical maximum data rate for a linear chromatic dispersion-limited monomode fiberguide system is about 0.13 Tbit/sec for a 20 km link with $\lambda = \lambda_c$. Achievement of this data rate requires that the equality $\lambda = \lambda_c$ be maintained to within much better than 1%, since a deviation by that much reduces the data rate by a factor of about 10. I will now show that in a system according to the invention the above data rate can be easily achieved, and also surpassed.

If the input pulsewidth $2t_o = 2$ ps, and the input peak power is 2.25 $P_o$, then after about $L_o$ pathlength in 0.2 dB/km fiber the pulse width will have contracted to about 1 ps, and thereafter will broaden again, to reach the original width again after about 15 km, and about 2.6 ps after 20 km total path length. This is sufficient to achieve a data rate of 0.13 Tbits/sec, since the latter implies a maximum pulse width of about 3.8 ps. $\Delta\lambda_{min}$ as determined from equations (8') and (9) is about $2.8 \cdot 10^{-3}$ $\mu m$ and $3.6 \cdot 10^{-3} \ \mu m$, respectively. Thus $\Delta\lambda = 0.01 \ \mu m$ is a conservative choice. Using this value one finds that $P_o \sim 150$ mW, and that therefore the input power that yields maximum pulse contraction is about 340 mW. This power results in a stabilization length $L_o \sim 470$ m, thus $L_o < < 20$ km, and the soliton can develop fully. Furthermore, after 20 km transmission the signal is still much larger than $P_o/4$, and therefore the power is sufficient for the soliton to exist throughout the link.

The above design example is meant to demonstrate a possible way of applying the criteria and relationships disclosed herein and to illustrate the advantageous results achievable with a system according to the invention, without limiting in any way the scope as defined by the claims.

What is claimed is:

1. A fiberguide telecommunication system comprising
   (a) a source of pulsed electromagnetic radiation, the pulses having a peak power, a center wavelength, and a spectral width,
   (b) a monomode fiberguide link having a length, first-order zero chromatic dispersion at a first wavelength in the anomalous dispersion regime of the fiberguide, and a loss at the center wavelength to result in a decrease of the pulse amplitude by about 63% in a first fiberlength, and
   (c) means for coupling at least a part of the pulsed radiation into the core of the fiberguide, characterized in that
   (d) the peak power of the radiation coupled into the core is between about $\frac{1}{4}$ and 9/4 of the balanced peak power,
   (e) the link length is at least approximately as large as the soliton formation length,
   (f) the first fiberlength is at least approximately as large as the soliton formation length, and
   (g) the center wavelength exceeds the first wavelength by at least about the spectral width of the radiation pulse.

2. A fiberguide telecommunication system comprising
   (a) a source of pulsed electromagnetic radiation, the pulses having a peak power, a center wavelength $\lambda$, and a pulse width $2t_o$,
   (b) a monomode fiberguide link of length L, the fiberguide having a core of effective cross section S, zero first-order chromatic dispersion at wavelength $\lambda_c$, in the anomalous dispersion regime of the fiberguide, loss at wavelength $\lambda$ to result in a decrease of the amplitude of the pulse by $1/e$ in a distance $\gamma^{-1}$, index of refraction n, and quadratic coefficient of the index $n_2$, and
   (c) means for coupling at least a part of the pulsed electromagnetic radiation into the core of the fiberguide, characterized in that
   (d) the peak power P of the pulsed electromagnetic radiation coupled into the fiber is adjusted to be between about $\frac{1}{4}$ and about 9/4 times a balanced peak power $P_o$,
   (e) the link length L is selected to be at least approximately as large as a soliton formation length $L_o$,
   (f) the fiber is selected to have a loss at the wavelength $\lambda$ such that the distance $\gamma^{-1}$ is at least approximately as large as $L_o$, and
   (g) the center wavelength $\lambda$ is selected to be at least as large as $\lambda_c + \Delta\lambda_{min}$, $$\text{where } P_o = \frac{c\epsilon_o n S(-\lambda^2 \partial^2 n/\partial\lambda^2)}{n_2 \omega_o^2 t_o^2}$$

$$L_o^{-1} \sim \omega_o n_2 |\phi|^2/2c$$

$$\Delta\lambda_{min} \sim \frac{1}{2t_\infty} \frac{\partial\lambda}{\partial f},$$

and also $\beta/\tau < 0.05$.

3. System according to claim 1 or 2 wherein the fiberguide comprises silica, and $\lambda_c$ is near or equal to 1.55 $\mu$m.

4. System according to claim 1 or 2 wherein the source of pulsed electromagnetic energy is a laser.

5. A fiberguide telecommunication system comprising
   (a) a laser source of pulsed electromagnetic radiation, the pulses having a peak power, a center wavelength $\lambda$, and a pulse width $2t_o$,
   (b) a monomode fiberguide link of length L, the fiberguide comprising silica and having a core of effective cross section S, zero first-order chromatic dispersion at wavelength $\lambda_c$ in the anomalous dispersion regime of the fiberguide, and loss at wavelength $\lambda$ to result in a decrease of the amplitude of the pulse by $1/e$ in a distance $\gamma^{-1}$, and
   (c) means for coupling at least a part of the pulsed electromagnetic energy into the core of the fiberguide, characterized in that
   (d) the fiberguide is selected to have zero first-order chromatic dispersion wavelength $\lambda_c$ near or equal to 1.55 $\mu$m,
   (e) the peak power P of the pulsed electromagnetic radiation coupled into the fiber is adjusted to be between about $\frac{1}{4}$ and about 9/4 times a balanced peak power $P_o$,
   (f) the link length L is selected to be at least approximately as large as a soliton formation length $L_o$,
   (g) the fiber is selected to have a loss at $\lambda$ such that the distance $\gamma^{-1}$ is at least approximately as large as $L_o$, and
   (h) the carrier wavelength $\lambda$ is selected to be close to $\lambda_c$, but at least as large as $\lambda_c + \Delta\lambda_{min}$, where $P_o(W) \sim S(\mu m^2) \lambda(\mu m)[\lambda - \lambda_c](\mu m)/2t_o^2(ps),$ $L_o(km) \sim 5.3 \cdot 10^{-3} \lambda(\mu m) S(\mu m^2)/P(W),$ $\Delta\lambda_{min} \sim 3.3 \cdot 10^{-3} \frac{\lambda^2(\mu m^2)}{2t_\infty(ps)}$ and also $\Delta\lambda_{min}(\mu m) 1.9 \cdot 10^{-2} [\lambda(\mu m) - 1]/2t_\infty(ps),$ where $2t_\infty$ is the width of the pulse after transmission through the fiber link.

* * * * *